(12) United States Patent
Fujiwara

(10) Patent No.: US 6,564,040 B1
(45) Date of Patent: May 13, 2003

(54) COMMUNICATION DEVICE AND COMMUNICATION METHOD

(75) Inventor: Yoji Fujiwara, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/573,325

(22) Filed: May 18, 2000

(30) Foreign Application Priority Data

May 25, 1999 (JP) .......................................... 11-145266

(51) Int. Cl.[7] ................................................ H04B 1/40
(52) U.S. Cl. ........................ 455/76; 455/260; 375/376
(58) Field of Search ................................ 455/260, 264, 455/75, 76; 375/376, 375

(56) References Cited

U.S. PATENT DOCUMENTS

| | | | | |
|---|---|---|---|---|
| 4,816,774 A | * | 3/1989 | Martin | 331/1 A |
| 5,065,408 A | * | 11/1991 | Gillig | 331/1 A |
| 5,319,798 A | * | 6/1994 | Watanabe | 331/25 |
| 6,185,411 B1 | * | 2/2001 | Gillig et al. | 331/14 |
| 6,289,208 B1 | * | 9/2001 | Hareyama | 375/376 |
| 6,335,953 B1 | * | 1/2002 | Sanderford et al. | 375/344 |

FOREIGN PATENT DOCUMENTS

JP        8-102689        4/1996

* cited by examiner

*Primary Examiner*—Thanh Congle
*Assistant Examiner*—Tan Trinh
(74) *Attorney, Agent, or Firm*—Pearne & Gordon LLP

(57) ABSTRACT

A communication device and a communication method, which is capable of reducing noises due to higher harmonic components and avoiding disturbance over a receiving function or a transmitting function by setting an oscillation frequency of an operation clock easily at a high speed and with high precision. The oscillation frequency of the operation clock is calculated by a microcomputer 109 such that higher harmonics of the operation frequency of the operation clock CLK1 can be positioned farthest from the receiving frequency, and a frequency dividing ratio of a variable frequency divider 105 of a PLL frequency synthesizer is set by a control signal CTL1 according to the operation frequency of the calculated operation clock CLK1, and then the operation clock CLK1 is generated by the PLL frequency synthesizer and then supplied to the microcomputer 109.

14 Claims, 9 Drawing Sheets

COMMUNICATION DEVICE AND COMMUNICATION METHOD

BACKGROUND OF THE INVENTION

The present invention relates to a communication device, a communication method, and a recording medium for recording a program employed to carry out the communication method. More particularly, the present invention relates to a communication device which is capable of reducing noises due to higher harmonic components of a clock so as to avoid the disturbance over its receiving function and its transmitting function by setting an oscillation frequency of the clock easily at a high speed and with high precision such that the higher harmonic components of the clock which drives processing means such as LSI's being built in the communication device can go farthest from a receiving frequency or a transmitting frequency, a communication method of operating the communication device, and a recording medium.

In recent years, in various communication devices having the receiving function and the transmitting function, a microcomputer, a digital signal processor (DSP), or special-purpose LSI's, etc. are incorporated and also an oscillating means for oscillating an LSI operation clock to drive these LSI's is provided. However, this LSI operation clock contains many higher harmonic components. When mixed into a receiving band or a transmitting band, the higher harmonic components disturb the receiving function and the transmitting function. For this reason, several techniques which avoid noises due to the LSI operation clock have been proposed in the prior art.

FIG. 9 is a schematic view showing a configuration of "A receiver device equipped with a clock oscillator circuit" disclosed in Unexamined Patent Application Publication Hei 8-102689 (first prior art). In FIG. 9, the receiver device comprises a receiver portion 506 having a received data decision circuit 507, a control voltage generator portion 505, and an oscillator circuit portion. The oscillator circuit portion comprises a crystal oscillator 501, an inverter 502, a capacitor 503, a variable capacitor (variable capacity diode) 504, and a resistor R.

The crystal oscillator 501 is caused by the inverter 502 to oscillate. According to capacitance values of the capacitor 503 and the variable capacitor 504, an oscillation frequency of an operation clock CLK5, which is generated by the oscillator circuit portion, can be decided. In this case, the capacitance of the variable capacitor 504 can be controlled by a control voltage which is output from the control voltage generator portion 505, and the control voltage can be decided based on information from the received data decision circuit 507 of the receiver portion 506.

Next, an operation of the receiver device in the first prior art will be explained hereunder. First, the received data decision circuit 507 of the receiver portion 506 makes decision of the received data during reception and then detects whether or not disturbance due to the operation noise of the microcomputer built in the receiver device is caused. If the disturbance is detected at that time, the received data decision circuit 507 outputs a control signal CTL5 to the control voltage generator portion 505 so as to change the control voltage, which is output from the control voltage generator portion 505, such that the oscillation frequency of the operation clock CLK5 can be slightly changed. Then, the oscillation frequency of the operation clock CLK5 of the microcomputer is still changed until such disturbance cannot be detected, so that degradation of the radio performance (receiving function) of the receiver device can be avoided.

Also, FIG. 10 shows a configuration of another receiver device having a noise canceling function (second prior art). In FIG. 10, the receiver device comprises a microcomputer 607 and the oscillator circuit portion. The oscillator circuit portion comprises a crystal oscillator 601, an inverter 602, capacitors 603, 604, a variable capacitor 605, a transistor 606, and the resistor R.

The crystal oscillator 601 is caused by the inverter 502 to oscillate. According to capacitance values of the capacitor 603 and 604, an oscillation frequency of an operation clock CLK6, which is generated by the oscillator circuit portion, can be decided. However, if the microcomputer 607 causes the transistor 606 to turn ON via a control signal CTL6, the oscillation frequency of the operation clock CLK6 can be decided based on a total capacitance value of the capacitance values of the capacitor 603, 604 and the capacitance value of the variable capacitor 605.

Next, an operation of the receiver device in the second prior art will be explained hereunder. First, normally the microcomputer 607 outputs an "L" level signal as the control signal CTL6 and then turns OFF the transistor 606 via the resistor R. At that time, the oscillation frequency of the operation clock CLK6 supplied to the microcomputer 607 can be decided according to the capacitance values of the capacitors 603 and 604 in the oscillator circuit portion. However, in the event that higher harmonics of the oscillation frequency of the operation clock CLK6 exist in the neighborhood of a receiving frequency to thus cause the degradation of the radio performance (receiving function), the microcomputer 607 outputs an "H" level signal as the control signal CTL6 to shift the transistor 606 into its ON state. Accordingly, the oscillation frequency of the operation clock CLK6 can be changed into a frequency which is decided by the capacitance values of the capacitors 603, 604 and the variable capacitor 605 in the oscillator circuit portion. Thus, the higher harmonics of the oscillation frequency of the operation clock CLK6 are separated away from the neighborhood of the receiving frequency, so that degradation of the radio performance (receiving function) can be prevented.

However, in the above receiver device in the first prior art, since the control voltage of the control voltage generator portion 505 is decided based on the decision result of the received data decision circuit 507 of the receiver portion 506, a time is needed to some extent until the control voltage has been decided. As a result, there have been the problems such that the response is not good until change/adjustment of the oscillation frequency of the operation clock CLK has been completed and that the period which is contained within a predetermined time but has low reliability of the received data still remains.

Furthermore, in the above receiver device in the second prior art, since the capacitance values in the oscillator circuit portion are changed according to the ON/OFF control of the transistor 606 based on the control signal CTL6, adjustment precision of the oscillation frequency is very rough. Thus, there have been the problems that it is difficult to adjust the higher harmonic components of the operation clock CLK6 of the microcomputer 607 so as to go away from the receiving frequency and that deterioration of the radio performance (receiving function) cannot be perfectly prevented.

SUMMARY OF THE INVENTION

The present invention has been made in view of the above problems in the prior art, and it is an object of the present invention to provide a communication device which is capable of reducing noises due to higher harmonic components of a clock and also avoiding the disturbance over its receiving function and its transmitting function by setting an oscillation frequency of the clock easily at a high speed and with high precision such that the higher harmonic components of the clock for driving processing means such as LSI's built in the communication device can positioned farthest from a receiving frequency or a transmitting frequency, a communication method of operating the communication device, and a recording medium.

In order to overcome the above subjects, according to first aspect of the present invention, a communication device comprises a clock generating means for generating a clock, a processing means which operates based on the clock, and a radio portion for processing a radio signal at a predetermined receiving frequency, an operation frequency controlling means for calculating an operation frequency of the clock such that higher harmonics of the operation frequency of the clock is positioned farthest from the radio frequency; wherein the clock generating means generates the clock having the operation frequency calculated by the operation frequency controlling means.

In the present invention, the radio portion may be a receiver portion for receiving a signal transmitted from another communication device at a predetermined receiving frequency and demodulating it, and the operation frequency controlling means calculates an operation frequency of the clock such that higher harmonics of the operation frequency of the clock can be positioned farthest from the receiving frequency and the clock generating means generates the clock having the operation frequency calculated by the operation frequency controlling means.

Also, the radio portion may be a transmitter portion for transmitting a transmit signal modulated at a predetermined transmitting frequency, and the operation frequency controlling means calculates an operation frequency of the clock such that higher harmonics of the operation frequency of the clock can be positioned farthest from the transmitting frequency; wherein the clock generating means generates the clock having the operation frequency calculated by the operation frequency controlling means.

Also, the radio portion may include a receiver portion for receiving a signal transmitted from another communication device at a predetermined receiving frequency and demodulating it, and a transmitter portion for transmitting a transmit signal modulated at a predetermined transmitting frequency, and the operation frequency controlling means calculates an operation frequency of the clock such that higher harmonics of the operation frequency of the clock can be positioned farthest from the receiving frequency or the transmitting frequency; wherein the clock generating means generates the clock having the operation frequency calculated by the operation frequency controlling means.

Preferably, in the communication device according to the present invention, the clock generating means is composed of a PLL frequency synthesizer which comprises a reference oscillator, a phase comparator, a low pass filter, a voltage controlled oscillator, and a variable frequency divider, and which varies the operation frequency of the clock by programmably changing a frequency dividing ratio of the variable frequency divider.

Preferably, the communication device according to the present invention further comprises a storing means for holding calculation results of the operation frequency of the clock whose higher harmonics can be positioned farthest from the receiving frequency or the transmitting frequency every receiving frequency or every transmitting frequency.

According to the second aspect of the present invention, there is provided a communication method for a communication device including a clock generating means for generating a clock, a processing means which operates based on the clock, and a radio portion for processing a radio signal at a predetermined frequency, the communication method comprising an operation frequency controlling step of calculating an operation frequency of the clock such that higher harmonics of the operation frequency of the clock can be positioned farthest from the radio frequency; wherein the clock generating means generates the clock having the operation frequency calculated by the operation frequency controlling step.

Preferably, the radio portion may be a receiver portion for receiving a signal transmitted from another communication device at a predetermined receiving frequency and demodulating it, and an operation frequency of the clock is calculated such that higher harmonics of the operation frequency of the clock can be positioned farthest from the receiving frequency.

Also, the radio portion may be a transmitter portion for transmitting a transmit signal modulated at a predetermined transmitting frequency, and an operation frequency of the clock is calculated such that higher harmonics of the operation frequency of the clock can be positioned farthest from the transmitting frequency Also, the radio portion may include a receiver portion for receiving a signal transmitted from another communication device at a predetermined receiving frequency and demodulating it, and a transmitter portion for transmitting a transmit signal modulated at a predetermined transmitting frequency, an operation frequency of the clock is calculated such that higher harmonics of the operation frequency of the clock can be positioned farthest from the receiving frequency or the transmitting frequency.

Preferably, in the communication method according to the present invention, the clock generating means is composed of a PLL frequency synthesizer which comprises a reference oscillator, a phase comparator, a low pass filter, a voltage controlled oscillator, and a variable frequency divider, and the operation frequency controlling step has a varying step of varying the operation frequency of the clock by setting a frequency dividing ratio into the variable frequency divider in accordance with a calculated operation frequency.

Preferably, the communication method further comprises a calculating step of calculating the operation frequency of the clock whose higher harmonics can be positioned farthest from the receiving frequency or the transmitting frequency every receiving frequency or every transmitting frequency; and a storing step of holding results calculated in the calculating step in a storing means.

Preferably, the operation frequency controlling step or the calculating step includes a first calculating step of calculating frequency difference between the higher harmonics, which can be positioned nearest to the receiving frequency or the transmitting frequency, out of the higher harmonics of the operation frequency of the clock and the receiving frequency or the transmitting frequency every operation frequency of the clock, which can be set in the clock generating means, and a second calculating step of identifying the higher harmonics, which has a maximum frequency difference out of frequency differences between higher harmonics which are calculated by the first calculating step and the receiving frequency or the transmitting frequency and then calculating the operation frequency of the clock corresponding to an identified higher harmonics.

In addition, there is provided a computer readable recording medium for recording the communication method set forth above as a program which causes a computer to carry out the communication method.

According to the present invention, the operation frequency of the clock is calculated by the operation frequency controlling means (operation frequency controlling step) such that the higher harmonics of the operation frequency of the clock can be positioned farthest from the receiving frequency or the transmitting frequency, and then the clock having the operation frequency calculated by the operation frequency controlling means (operation frequency controlling step) is generated by the clock generating means.

Where the "clock" is generated by the clock generating means, and the communication device employs the clock to drive or operate the built-in processing means which executes control, analysis, etc. of the process. The microcomputer (microprocessor), the digital signal processor (DSP), the special-purpose LSI, or the like correspond to the "processing means". Also, the operation frequency controlling means can be implemented by the above processing means, for example, and also the operation frequency controlling step can be implemented by the program carried out by the processing means.

In this way, the oscillation frequency of the clock is calculated by the operation frequency controlling means (operation frequency controlling step) such that the higher harmonics of the operation frequency of the clock can be positioned farthest from the receiving frequency or the transmitting frequency, and then the clock having the calculated operation frequency is generated by the clock generating means such as the PLL frequency synthesizer. Therefore, the oscillation frequency of the clock can be set easily at a high speed and with high precision such that the higher harmonic components of the clock which drives the processing means built in the communication device can be positioned farthest from the receiving frequency or the transmitting frequency. As a result, the noises due to the higher harmonic components of the operation clock can be reduced, the disturbance over the receiving function or the transmitting function of the communication device can be avoided, and deterioration of the radio performance can be completely prevented.

Especially, the clock generating means is composed of the PLL frequency synthesizer which comprises the reference oscillator, the phase comparator, the low pass filter, the voltage controlled oscillator, and the variable frequency divider. In the operation frequency controlling means (operation frequency controlling step), the operation frequency of the clock is varied by setting the frequency dividing ratio, which correspond to the calculated operation frequency, into the variable frequency divider (by the changing step).

In this fashion, since the clock generating means is constructed by the programmable PLL frequency synthesizer, the frequency variable range can be set wide and the frequency change can be made easy. Also, since the crystal oscillator is employed as the reference oscillator 101 to generate the reference signal (reference frequency), the operation frequency can be adjusted with extremely high precision.

Also, the operation frequency of the clock whose higher harmonics can be positioned farthest from the receiving frequency or the transmitting frequency is calculated (by the calculating step) every receiving frequency or every transmitting frequency, and the results calculated (by the calculating step) are held in the storing means (in the storing step). In this case, this process (carried out by the calculating step and the storing step) may be conducted by either the operation frequency controlling means (operation frequency controlling step) or the external processing means of the communication device.

Likewise, the operation frequency of the clock is calculated previously relative to each receiving frequency or each transmitting frequency and then held in the storing means. Therefore, the oscillation frequency of the clock, which is able to reduce the noises due to the higher harmonic components and avoid the disturbance over the receiving function or the transmitting function, can be set easily at a higher speed and with high precision according to the receiving frequency or the transmitting frequency.

In addition, in the operation frequency controlling step or the calculating step, frequency difference between the higher harmonics, which can be positioned nearest to the receiving frequency or the transmitting frequency, out of the higher harmonics of the operation frequency of the clock and the receiving frequency or the transmitting frequency is calculated by the first calculating step every operation frequency of the clock, which can be set in the clock generating means, and then the higher harmonics which has a maximum frequency difference out of frequency differences between higher harmonics which are calculated by the first calculating step and the receiving frequency or the transmitting frequency is identified and then the operation frequency of the clock corresponding to an identified higher harmonics is calculated by the second calculating step.

DETAILED DESCRIPTION OF THE PREFERRED EMBODIMENTS

Embodiments of a communication device, a communication method, and a recording medium according to the present invention will be explained in detail with reference to the accompanying drawings in the order of [first embodiment], [second embodiment], [third embodiment], and [fourth embodiment] hereinafter. As for the explanation of respective embodiments, the communication device and the communication method according to the present invention will be explained in detail hereinafter, but explanation of the recording medium according to the present invention will be contained in the explanation of the following communication method since the recording medium is used to store a program to carry out the communication method.

FIRST EMBODIMENT

Figure 1:
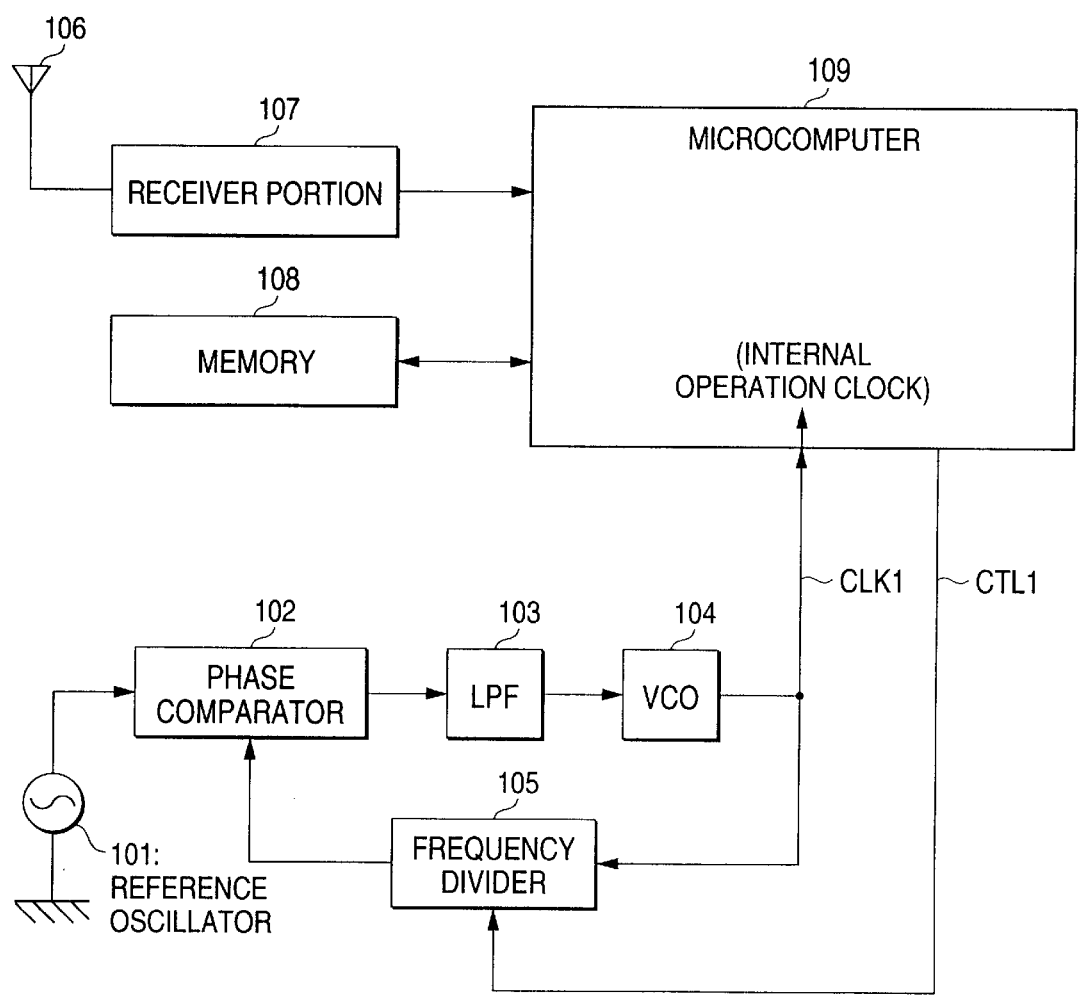
FIG. 1 is a view showing a configuration of a communication device according to a first embodiment of the present invention.

FIG. 1 is a view showing a configuration of a communication device according to a first embodiment of the present invention. The communication device according to the first embodiment has the receiving function, and is constructed to have a microcomputer 109 for executing control, analysis, etc. of the process.

In FIG. 1, the communication device of the first embodiment comprises an antenna 106 for receiving the receive signal, a receiver portion 107 for demodulating a signal received via the antenna 106, a memory 108 for storing information such as the receiving frequency, etc., a microcomputer 109 for executing analysis of the signal being demodulated by the receiver portion 107, control of the operation of the communication device, etc., and the oscillator circuit portion for generating the operation clock CLK1 for the microcomputer 109. In this case, for example, a programmable nonvolatile memory such as EEPROM (Electrically Erasable and Programmable Read Only Memory), etc. may be employed as the memory 108.

Further, the oscillator circuit portion can be implemented by using a PLL frequency synthesizer. The oscillator circuit portion comprises a reference oscillator 101 for oscillating a reference frequency, a phase comparator 102 for comparing the reference frequency with a compared frequency which is obtained by frequency-dividing an output frequency of a VCO 104 in phase, an LPF (Low Pass Filter) 103 for smoothing an output of the phase comparator 102 to change it into a direct current signal, a VCO (Voltage Controlled Oscillator) 104 for generating the oscillation frequency in compliance with the voltage which is an output from the LPF 103, and a variable frequency divider 105 which sets programmably a frequency dividing ratio and divides the frequency generated by the VCO 104 based on the frequency dividing ratio. In this event, an output of the VCO 104 is supplied to the microcomputer 109 as an operation clock CLK1. Also, the PLL frequency synthesizer may be constructed to contain at least the above constituent elements in configuration. For instance, if the commercially available chip is employed, the configuration which includes a frequency dividing ratio controlling circuit having a register for holding the frequency dividing ratio, etc. in the chip in addition to the above constituent elements, and the like, may be considered.

In the PLL frequency synthesizer (oscillator circuit portion), the variable frequency divider 105 frequency-divides the signal being output from the VCO 104, but the setting of the frequency dividing ratio (n) is executed based on the control signal CTL1 from the microcomputer 109. Then, the phase comparator 102 compares the signal being frequency-divided by the variable frequency divider 105 with the reference signal supplied from the in phase and frequency. When the frequency is brought into a lock state in the PLL frequency synthesizer, the frequency (f) of the operation clock CLK1 becomes the frequency dividing ratio (n) times the frequency of the reference signal. Therefore, if the frequency dividing ratio of the variable frequency divider 105 is variably controlled by the control signal CTL1 supplied from the microcomputer 109, the operation clock CLK1 whose frequency is an integral multiple of the frequency of the reference signal can be obtained precisely, and then can be supplied from the microcomputer 109.

Next, in order to reduce the noise due to the higher harmonic components of the operation clock CLK1 for driving the microcomputer 109 and to avoid the influence on the radio performance of the communication device, the method of setting the operation frequency of the operation clock CLK1, which is carried out by the communication device in the first embodiment, will be explained in detail with reference to FIGS. 2 to 5 hereunder.

Figure 2:
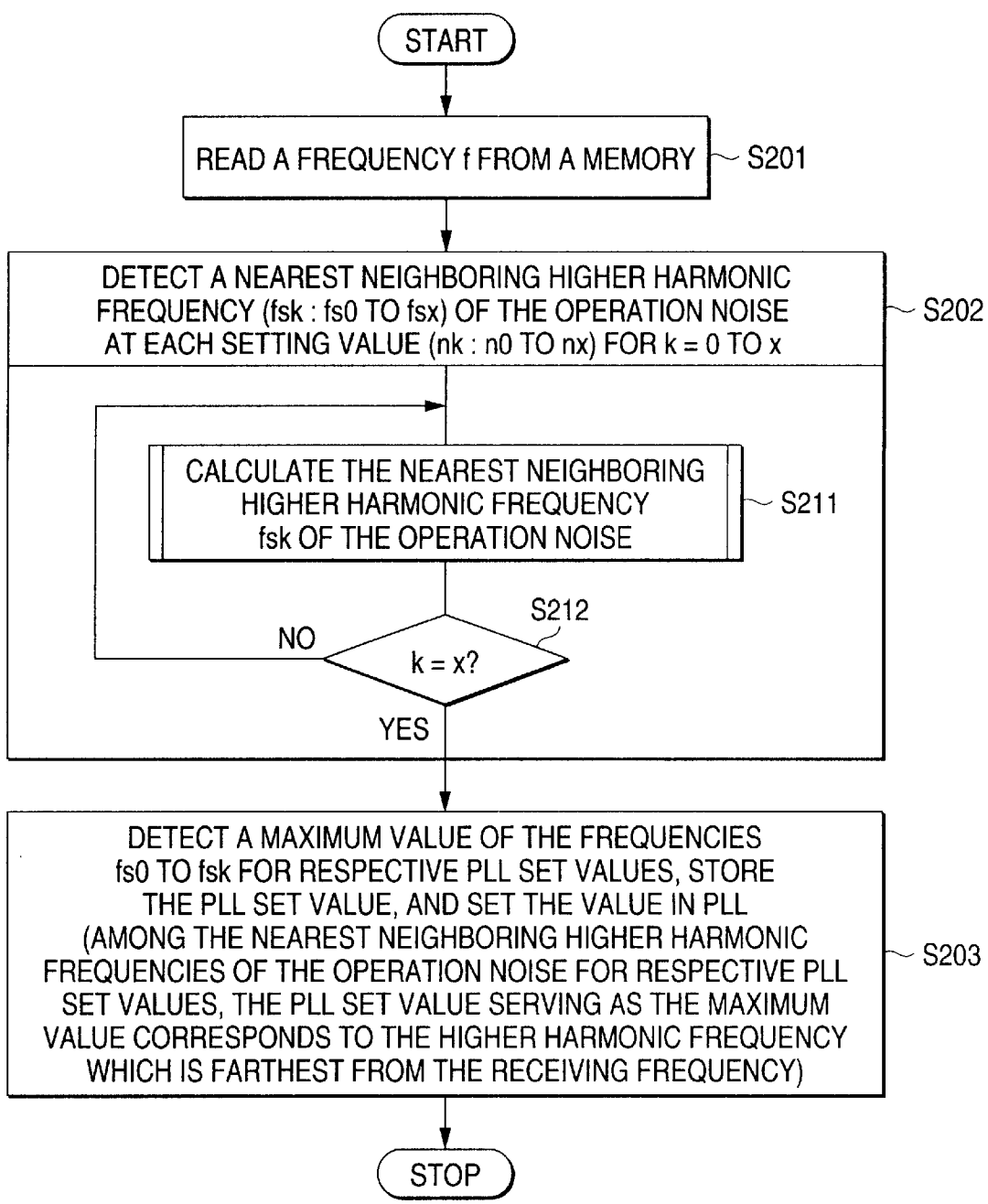
FIG. 2 is a schematic flowchart illustrating a communication method (operation clock setting method) employed in the communication device in the first embodiment.
Figure 3:
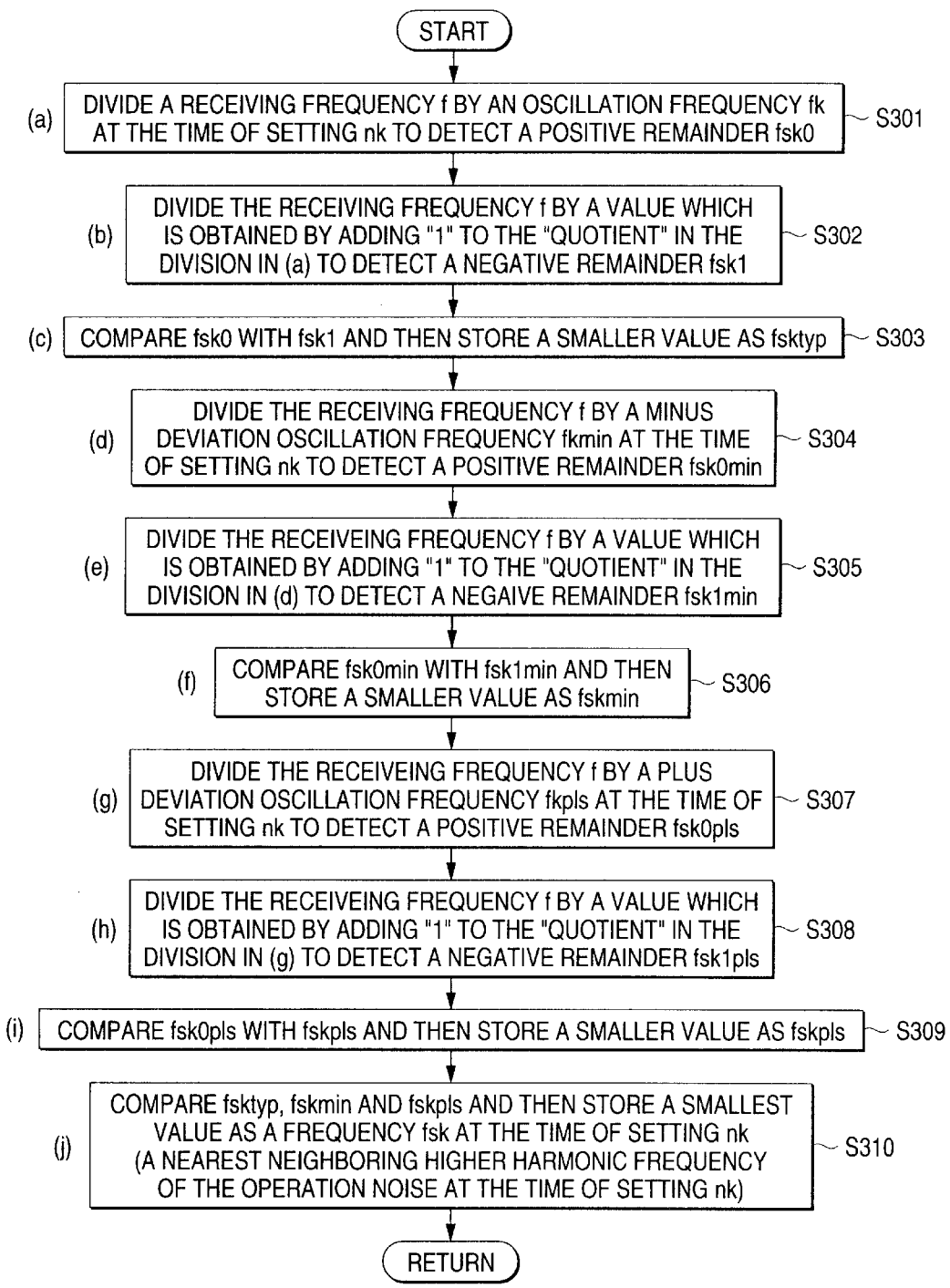
FIG. 3 is a flowchart illustrating a subroutine for calculating a nearest neighboring higher harmonic frequency of an operation noise in the communication method in the first embodiment.
Figure 4:
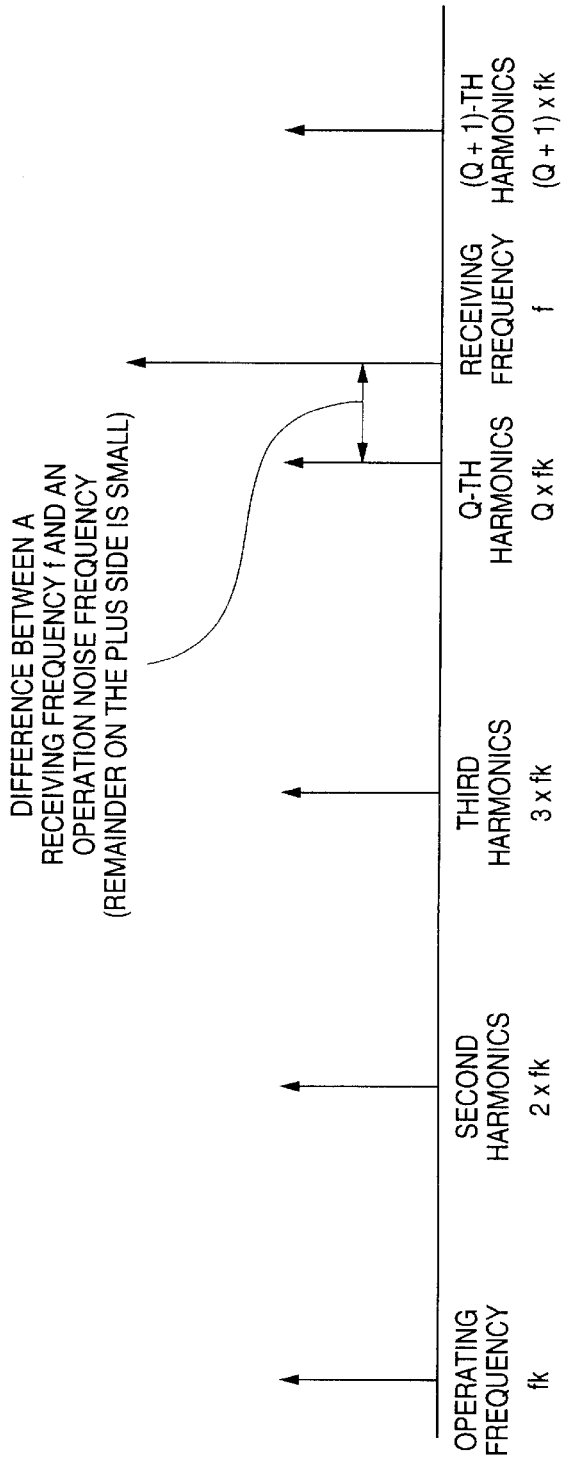
FIG. 4 is a chart illustrating a relationship between higher harmonics of an operation frequency of an operation clock and a receiving frequency (No. 1)
Figure 5:
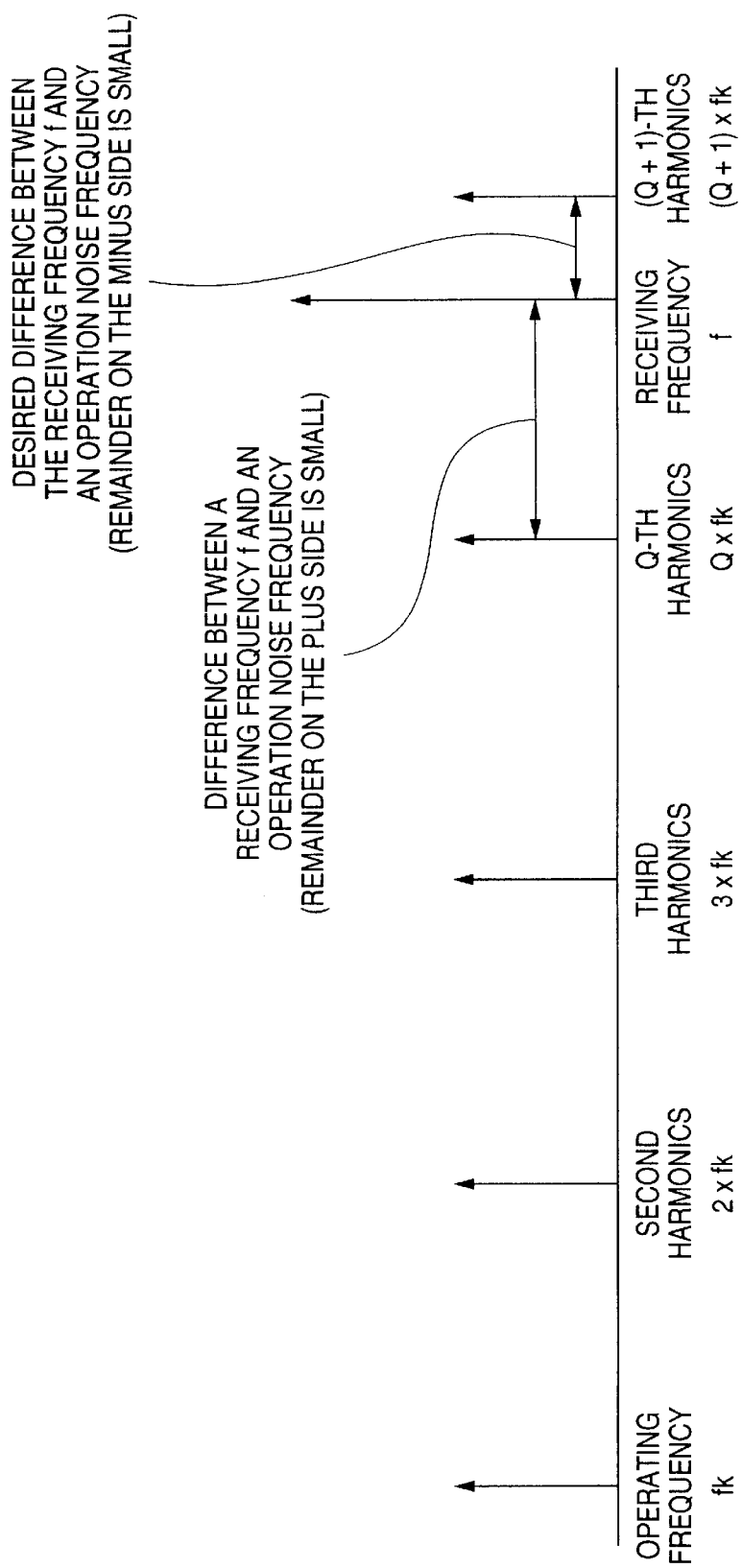
FIG. 5 is a chart illustrating the relationship between higher harmonics of the operation frequency of the operation clock and the receiving frequency (No. 2)

Then, the setting of the operation clock CLK1 is performed when the microcomputer 109 calculates the oscillation frequency such that the higher harmonic components of the operation frequency of the operation clock CLK1 can be remote farthest from the receiving frequency and then variably controls the frequency dividing ratio of the variable frequency divider 105 via the control signal CTL1. Also, FIG. 2 is a schematic flowchart illustrating the communication method (method of setting the operation clock CLK1) employed in the communication device in the first embodiment. FIG. 3 is a flowchart illustrating a subroutine for calculating a nearest neighboring higher harmonic frequency of the operation noise for respective setting values of the frequency dividing ratio in the communication method in the first embodiment. FIGS. 4 and 5 are charts illustrating a relationship between higher harmonics of the operation frequency of the operation clock and the receiving frequency respectively.

Prior to the explanation, several premises and definitions of employed symbols will be given hereunder. To begin with, assume that information for the previously set receiving frequency are stored in the memory 108, and that the variable range of the operation frequency of the operation clock CLK1 of the microcomputer 109 and deviation of the VCO 104 are previously decided by the PLL frequency synthesizer. In other words, based on the information for the receiving frequency, the variable range of the operation frequency and the deviation of the VCO 104 of the PLL frequency synthesizer, following calculation processes are carried out and also the operation frequency of the operation clock CLK1 of the microcomputer 109 is decided. Then, if the deviation of the VCO 104 can be neglected in computation, calculation items of the deviation of the VCO 104 (steps S304 to S310 in FIG. 3) may be omitted in following calculating procedures. Further, assume that the receiving frequency is f, the variable range of the operation frequency of the PLL frequency synthesizer, i.e., the frequency dividing ratio setting variable range is n0 to nx, the oscillation frequency which is output from the VCO 104 at that time is f0 to fx, and the deviation of the VCO 104 is ±a [%].

In FIG. 2, in step S201, first the microcomputer 109 reads the receiving frequency information (receiving frequency f) from the memory 108.

Then, in step S202 which corresponds to a first calculating step set forth in Claim, as for each frequency dividing ratio nk (n0 to nx) which can be set in the PLL frequency synthesizer, frequency difference between the higher harmonics, which is closest to the receiving frequency f, out of many higher harmonics of the operation frequency of the operation clock CLK1 which correspond to the frequency dividing ratio nk and the receiving frequency f is detected as the nearest neighboring higher harmonic frequency fsk (fs0 to fsx) of the operation noise. In other words, a subroutine for calculating the nearest neighboring higher harmonic frequency fsk of the operation noise for each setting value of the frequency dividing ratio nk in step S211 is executed in the range of k=0 to x (step S212).

The subroutine for calculating the nearest neighboring higher harmonic frequency fsk of the operation noise is shown in FIG. 3. First, in step S301, the receiving frequency f is divided by the oscillation frequency fk of the operation clock CLK1 at the time of setting the frequency dividing ratio nk to detect a positive remainder fsk0. This remainder fsk0 denotes frequency difference between the receiving frequency f and the higher harmonic frequency of the operation noise of the microcomputer 109. As shown in FIG. 4, the higher harmonic frequency of the operation noise of the microcomputer 109 can go away from the receiving frequency f as this frequency difference is increased. As a result, the influence of the higher harmonic frequency of the operation noise on the radio performance of the radio system can be reduced.

However, since this remainder fsk0 is the positive value, the nearest neighboring higher harmonic frequency fsk of the operation noise with respect to the receiving frequency can be detected if, as shown in FIG. 4, the remainder on the plus side is smaller than the remainder on the minus side. On the contrary, as shown in FIG. 5, if the remainder on the minus side is smaller than the remainder on the plus side, the negative remainder fsk1 must be calculated separately and then the nearest neighboring higher harmonic frequency fsk of the operation noise must be detected by comparing the positive remainder fsk0 with the negative remainder fsk1. At this time, the quotient is assumed as Q, following equations are satisfied.

$$fsk0 = f - fk \cdot Q$$

$$fsk1 = fk \cdot (Q+1) - f$$

In other words, in step S302, the receiving frequency f is divided by a value which is obtained by adding "1" to the "quotient" in the division in step S301 to detect a negative remainder fsk1. Then, in step S303, the positive remainder fsk0 and the negative remainder fsk1 are compared with each other, and then a smaller value of them is stored in the memory 109 as a zero deviation nearest neighboring higher harmonic frequency fsktyp of the operation noise.

Then, while taking account of deviation ±a [%] from the oscillation frequency output from the PLL frequency synthesizer at the setting value of the frequency dividing ratio nk, a minus deviation oscillation frequency fkmin output from the PLL frequency synthesizer fkmin=fk·(1−a %) and a plus deviation oscillation frequency fkpls output from the PLL frequency synthesizer fkpls=fk·(1+a %) are calculated.

That is, as with the minus deviation oscillation frequency, in step S304, the receiving frequency f is divided by the minus deviation oscillation frequency fkmin from the PLL frequency synthesizer at the time of setting the frequency dividing ratio nk to detect a positive remainder fsk0min. Then, in step S305, the receiving frequency f is divided by a value which is obtained by adding "1" to the "quotient" in the division in step S304 to detect a negative remainder fsk1min. Then, in step S306, the positive remainder fsk0min and the negative remainder fsk1min are compared with each other, and then a smaller value of them is stored in the memory 109 as a minus deviation nearest neighboring higher harmonic frequency fskmin of the operation noise.

Similarly, as with the plus deviation oscillation frequency, in step S307, the receiving frequency f is divided by the plus deviation oscillation frequency fkpls from the PLL frequency synthesizer at the time of setting the frequency dividing ratio nk to detect a positive remainder fsk0pls. Then, in step S308, the receiving frequency f is divided by a value which is obtained by adding "1" to the "quotient" in the division in step S307 to detect a negative remainder fsk1pls. Then, in step S309, the positive remainder fsk0pls and the negative remainder fsk1pls are compared with each other, and then a smaller value of them is stored in the memory 109 as a plus deviation nearest neighboring higher harmonic frequency fskpls of the operation noise.

Then, in step S310, the zero deviation higher harmonic frequency fsktyp, the minus deviation higher harmonic frequency fskmin, and the plus deviation higher harmonic frequency fskpls are compared mutually, and then a smallest value is stored in the memory 109 as a higher harmonic frequency fsk at the time of setting the frequency dividing ratio nk. Thus, the subroutine for calculating the nearest neighboring higher harmonic frequency fsk of the operation noise is ended.

When the processes in steps S301 to S310 have been executed for the range of k=0 to x (step S212), the nearest neighboring higher harmonic frequency fsk (fs0 to fsx) of the operation noise is detected every frequency dividing ratio nk (n0 to nx). Then, the process advances to step S203 which corresponds to a second calculating step in claim. The higher harmonics having a maximum frequency difference between the detected higher harmonic frequency fsk and the receiving frequency is identified and then the operation frequency of the clock corresponding to the identified higher harmonics is detected.

In other words, in step S203, a maximum frequency dividing ratio nk is detected from the nearest neighboring higher harmonic frequency fsk (fs0 to fsx) of the operation noise every detected frequency dividing ratio nk (n0 to nx), and then the frequency dividing ratio nk is set in the variable frequency divider 105 of the PLL frequency synthesizer. As a result, the higher harmonic frequency of the operation noise output from the PLL frequency synthesizer can be positioned farthest from the receiving frequency, and thus the influence of the higher harmonic frequency of the operation noise upon the radio performance can be suppressed to the lowest minimum.

As described above, in the communication device and the communication method in the first embodiment, the oscillation frequency of the operation clock CLK1 is calculated by the microcomputer 109 such that the higher harmonics of the operation frequency of the operation clock CLK1 can be positioned farthest from the receiving frequency, and then the operation clock CLK1 having the calculated operation frequency is generated by the PLL frequency synthesizer. Therefore, the oscillation frequency of the operation clock CLK1 can be set easily at a high speed and with high precision such that the higher harmonic components of the operation clock CLK1 which drives the microcomputer 109 being built in the communication device can be separated farthest from the receiving frequency. As a result, noises due to the higher harmonic components of the operation clock CLK1 can be reduced and the disturbance over the receiving function of the communication device can be avoided, and also degradation of the radio performance can be completely prevented. Furthermore, since the programmable PLL frequency synthesizer is utilized, the frequency variable range can be made wide and the frequency change can be made easy. Also, since the crystal oscillator is employed as the reference oscillator 101 to generate the reference signal (reference frequency), the operation frequency can be adjusted with extremely high precision.

SECOND EMBODIMENT

Figure 6:
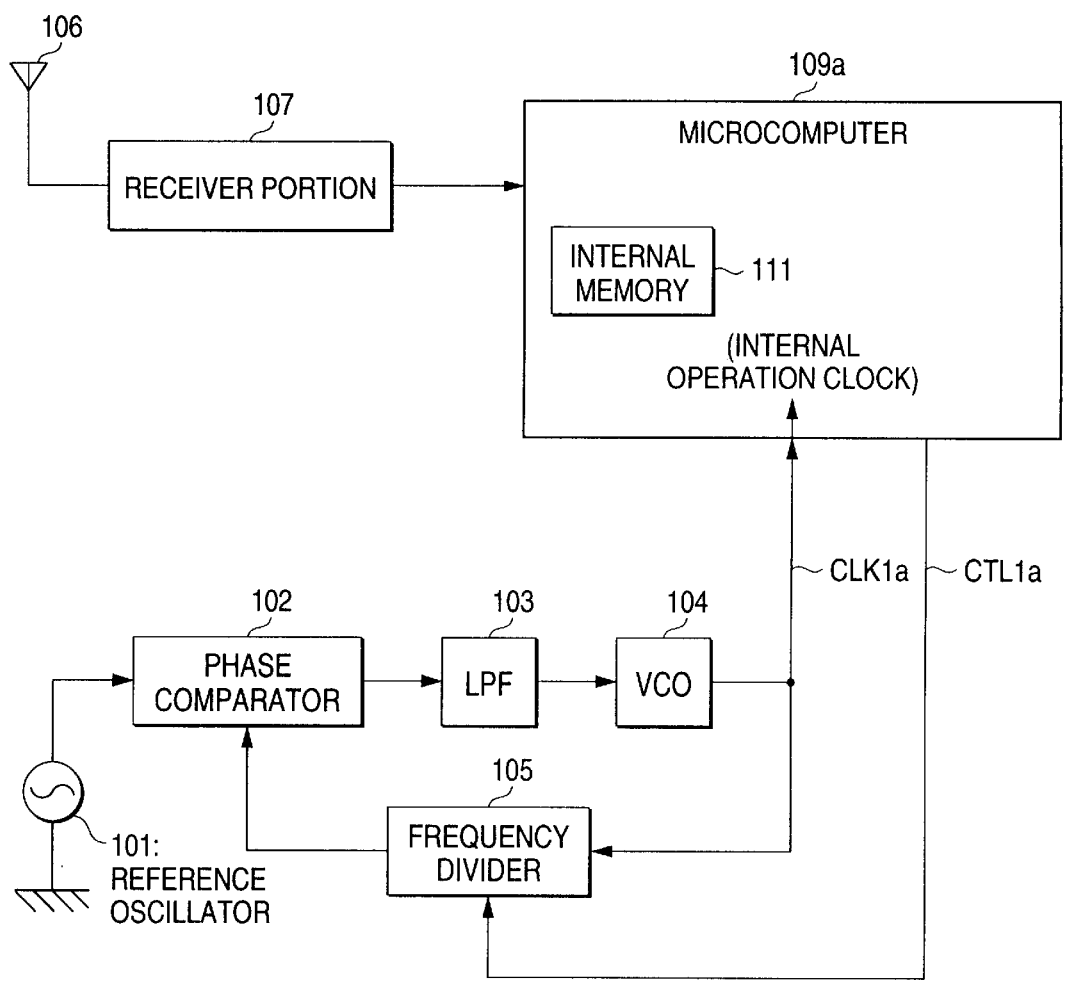
FIG. 6 is a view showing a configuration of a communication device according to a second embodiment of the present invention.

Next, FIG. 6 is a view showing a configuration of a communication device according to a second embodiment of the present invention. The communication device of the second embodiment has the receiving function like the first embodiment, and is constructed to have a microcomputer 109a for executing control, analysis, etc. of the processes.

In FIG. 6, the communication device of the second embodiment is constructed to comprise the antenna 106, the receiver portion 107, the microcomputer 109a in which an internal memory 111 is built, and the oscillator circuit portion for generating an operation clock CLK1a for the microcomputer 109a. Because the second embodiment is similar to the first embodiment (FIG. 1) except that the memory 108 which stores the information of the receiving frequency, etc. is replaced with the internal memory (ROM) 111 which stores information of the setting value of the frequency dividing ratio of the variable frequency divider 105 in the PLL frequency synthesizer relative to every receiving frequency, the explanation as for functions of other constituent elements will be omitted hereinbelow.

Also, the oscillator circuit portion is also implemented by the PLL frequency synthesizer like the first embodiment, and is constructed to comprise the reference oscillator 101, the phase comparator 102, the LPF 103, the VCO 104, and the variable frequency divider 105. In the PLL frequency synthesizer (oscillator circuit portion), the frequency dividing ratio (n) of the variable frequency divider 105 is set based on the control signal CTL1a supplied from the microcomputer 109a. Thus, the operation clock CLK1a whose frequency is an integral multiple of the frequency of the reference signal can be obtained precisely, and then can be supplied to the microcomputer 109a.

In the communication device of the second embodiment, in order to reduce the noises due to the higher harmonic components of the operation clock CLK1a which drives the microcomputer 109a and to avoid the influence of the noises on the radio performance of the communication device, the operation frequency of the operation clock CLK1a can be calculated based on the same method as the communication device in the first embodiment (see FIG. 2 and FIG. 3). In this case, the second embodiment is different from the first embodiment in that the setting values of the frequency dividing ratio of the variable frequency divider 105 of the PLL frequency synthesizer relative to every receiving frequency are calculated separately in advance, and then stored in the internal memory 111 in the microcomputer 109a. The calculating process of the operation frequency may be conducted by either the microcomputer 109a or an external processing means of the communication device.

In other words, in the communication device of the second embodiment, the calculation results of the setting values of the frequency dividing ratio of the variable frequency divider 105 of the PLL frequency synthesizer relative to every receiving frequency are stored previously in the internal memory 111. Thus, if the receiving frequency f is changed, the frequency dividing ratio can be set by referring to the calculation results stored in the internal memory 111 without the re-calculation of the frequency dividing ratio unlike the first embodiment. Therefore, the setting of the operation frequency of the operation clock CLK1a, which can reduce the noises due to the higher harmonic components of the operation clock CLK1a, avoid the disturbance over the receiving function, and prevent the degradation of the radio performance, can be achieved at the higher speed according to the receiving frequency.

THIRD EMBODIMENT

Figure 7:
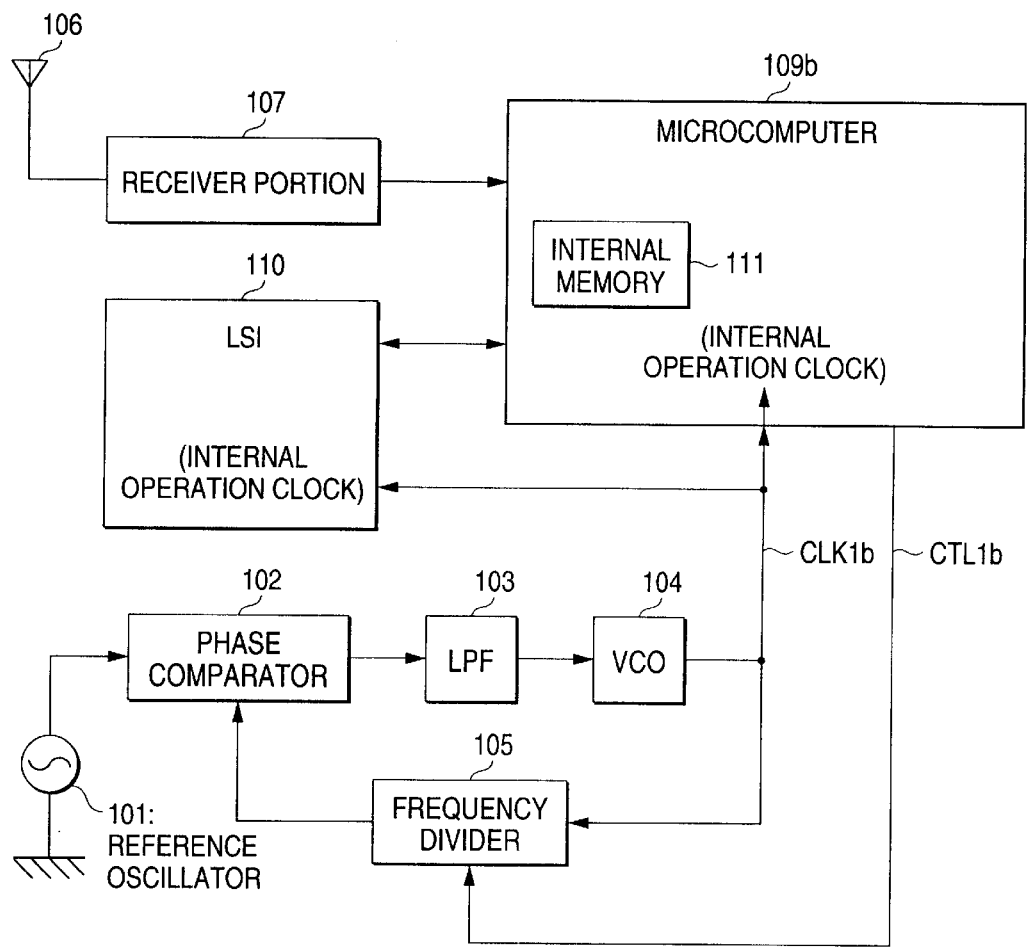
FIG. 7 is a view showing a configuration of a communication device according to a third embodiment of the present invention.

Next, FIG. 7 is a view showing a configuration of a communication device according to a third embodiment of the present invention. The communication device of the third embodiment has the receiving function like the first embodiment, and is contracted to comprise a microcomputer 109b for executing control, analysis, etc. of the processes, and an LSI 110.

In FIG. 7, the communication device of the third embodiment is constructed to comprise the antenna 106, the receiver portion 107, the microcomputer 109b in which the internal memory 111 is built, the LSI 110, and the oscillator circuit portion for generating an operation clock CLK1b for the microcomputer 109b and the LSI 110. In this case, since this third embodiment is similar to the second embodiment (FIG. 6) except that the LSI (Large Scale Integrated Circuit) 110 which is employed for analysis and control so as to function as a peripheral device of the microcomputer 109b is added to the second embodiment, the explanation of the functions of other constituent elements will be omitted.

Also, the oscillator circuit portion is also implemented by the PLL frequency synthesizer like the first embodiment, and is constructed to comprise the reference oscillator 101, the phase comparator 102, the LPF 103, the VCO 104, and the variable frequency divider 105. In the PLL frequency synthesizer (oscillator circuit portion), the frequency dividing ratio (n) of the variable frequency divider 105 is set based on the control signal CTL1b supplied from the microcomputer 109b. Thus, the operation clock CLK1b whose frequency is an integral multiple of the frequency of the reference signal can be obtained precisely, and then can be supplied to the microcomputer 109b and the LSI 110.

In the communication device of the third embodiment, like the communication device of the second embodiment, the setting values of the frequency dividing ratio of the variable frequency divider 105 of the PLL frequency synthesizer relative to every receiving frequency are calculated separately in advance by the same method as the communication device in the first embodiment (see FIG. 2 and FIG. 3), and then stored in the internal memory 111 in the microcomputer 109b. In other words, if the receiving frequency f is changed in the communication device of the third embodiment, the frequency dividing ratio can be set by referring to the calculation results stored in the internal memory 111 without the re-calculation of the frequency dividing ratio unlike the first embodiment. Therefore, the setting of the operation frequency of the operation clock CLK1b for the microcomputer 109b and the LSI 110 can be achieved at the higher speed, the noises due to the higher harmonic components of the operation clock CLK1b can be reduced according to the receiving frequency, and the degradation of the radio performance can be prevented by avoiding the disturbance over the receiving function.

FOURTH EMBODIMENT

Figure 8:
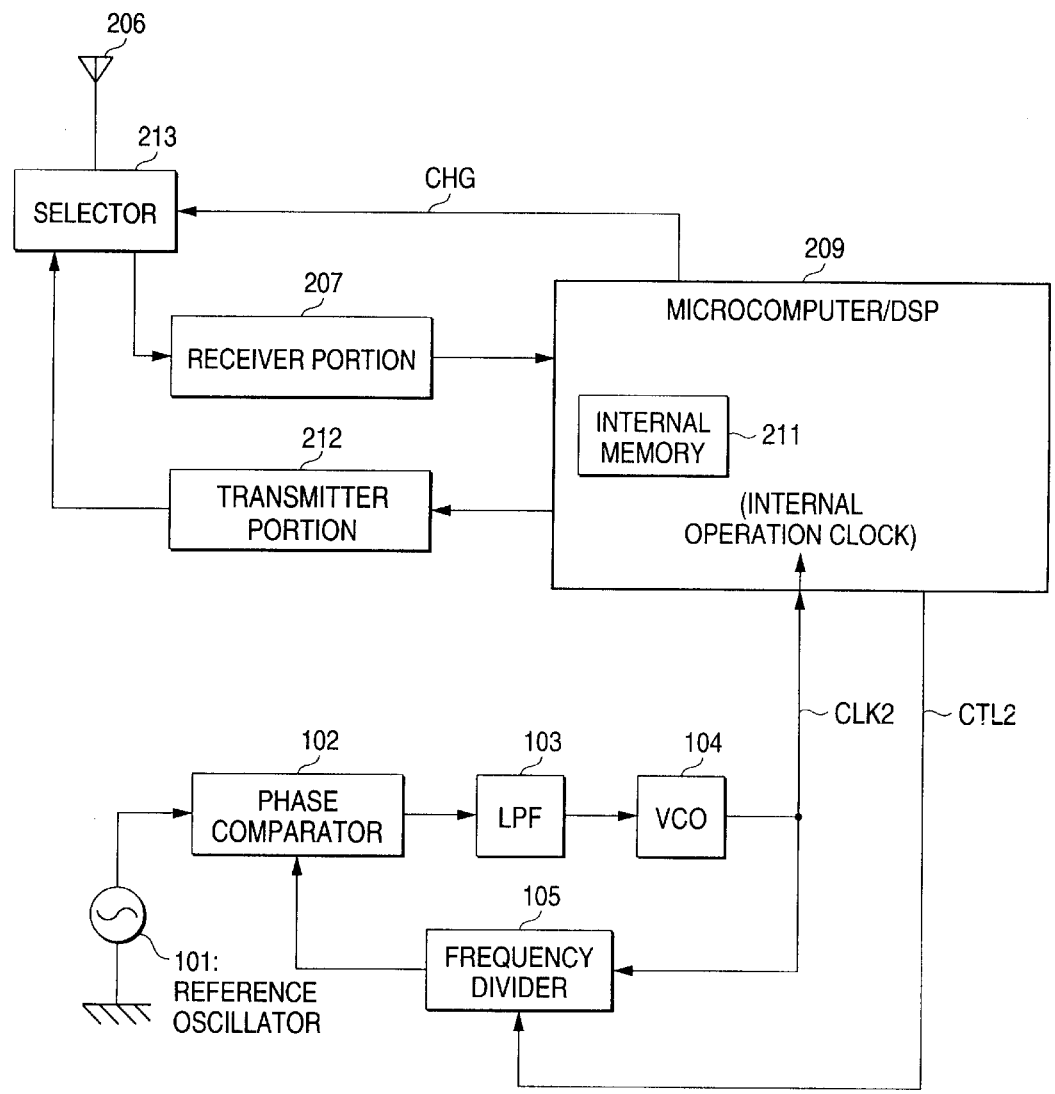
FIG. 8 is a view showing a configuration of a communication device according to a fourth embodiment of the present invention.
Figure 9:
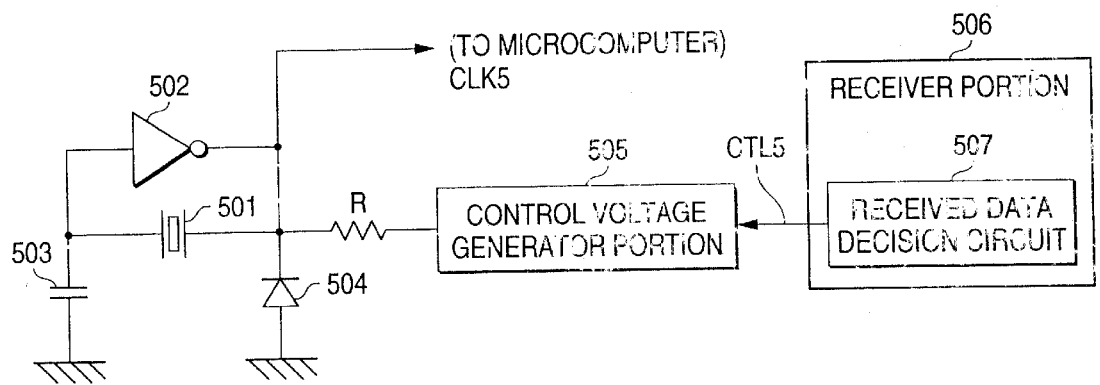
FIG. 9 is a schematic view showing a configuration of a receiver device which is equipped with a clock oscillator circuit in the first prior art.
Figure 10:
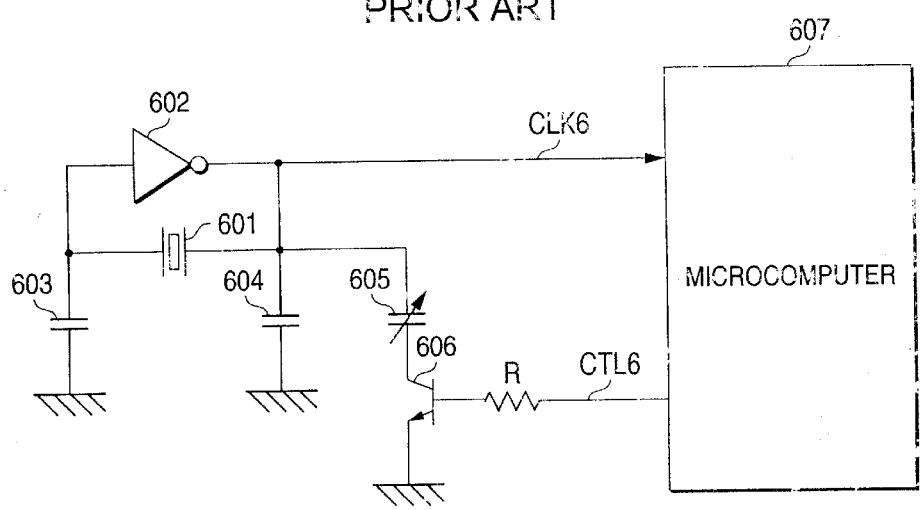
FIG. 10 is a view showing a configuration of a receiver device having a noise canceling function in the second prior art.

Next, FIG. 8 is a view showing a configuration of a communication device according to a fourth embodiment of the present invention. The communication device of the fourth embodiment has the receiving function and the transmitting function, and is constructed to comprise a microcomputer/DSP 209 for executing control, analysis, etc. of the processes.

In FIG. 8, the communication device of the fourth embodiment comprises an antenna 206 for receiving the receive signal and transmitting the transmit signal, a selector 213 for performing the switching between the signal received from the antenna 206 and the signal transmitted to the antenna 206, a receiver portion 207 for receiving the signal received from the antenna 206 via the selector 213 at the time of reception and demodulating the received signal, a transmitter portion 212 for generating the transmit signal which is transmitted from the antenna 206 via the selector 213 at the time of transmission, and a microcomputer/DSP 209 for executing analysis of the signal demodulated by the receiver portion 207 and output of the transmit signal to the transmitter portion 212 and also executing operation control, etc. of the communication device by using a built-in internal memory 211, the oscillator circuit portion for generating an operation clock CLK2 for the microcomputer/DSP 209.

The microcomputer/DSP 209 may be composed of any one of a microcomputer (microprocessor) and a DSP (Digital Signal Processor). The built-in internal memory 211 is formed of a ROM. Also, the information of the setting values of the frequency dividing ratio of the frequency divider 105 of the PLL frequency synthesizer relative to every receiving frequency and every transmitting frequency, etc. are stored in the internal memory 211.

Also, the oscillator circuit portion is also implemented by the PLL frequency synthesizer like the first embodiment, and is constructed to comprise the reference oscillator 101, the phase comparator 102, the LPF 103, the VCO 104, and the variable frequency divider 105. In the PLL frequency synthesizer (oscillator circuit portion), the frequency dividing ratio (n) of the variable frequency divider 105 is set based on a control signal CTL2 supplied from the microcomputer/DSP 209. Thus, the operation clock CLK2 whose frequency is an integral multiple of the frequency of the reference signal can be obtained precisely, and then can be supplied to the microcomputer/DSP 209.

In the communication device of the fourth embodiment, in order to reduce the noises due to the higher harmonic components of the operation clock CLK2 which drives the microcomputer/DSP 209 and to avoid the influence of the noises on the radio performance of the communication device, the operation frequency of the operation clock CLK1$a$ can be calculated based on the same method as the communication device in the first embodiment (see FIG. 2 and FIG. 3). In this case, the second embodiment is different from the first embodiment in that the setting values of the frequency dividing ratio of the variable frequency divider 105 of the PLL frequency synthesizer relative to every receiving frequency are calculated separately in advance, and then stored in the internal memory 111 in the microcomputer 109$a$. The calculating process of the operation frequency may be conducted by either the microcomputer 109$a$ or an external processing means of the communication device.

In other words, in the communication device of the fourth embodiment, the calculation results of the setting values of the frequency dividing ratio of the variable frequency divider 105 of the PLL frequency synthesizer relative to every receiving frequency are stored previously in the internal memory 211. In this case, the setting values of the frequency dividing ratio relative to each transmitting frequency can be calculated by replacing the receiving frequency with the transmitting frequency in the calculation method in the communication device of the first embodiment (FIG. 2 and FIG. 3).

Accordingly, if the receiving frequency f or the transmitting frequency is changed, the frequency dividing ratio can be set by referring to the calculation results stored in the internal memory 211 without the re-calculation of the frequency dividing ratio. Therefore, the setting of the operation frequency of the operation clock CLK2 of the microcomputer/DSP 209 can be achieved at the higher speed, the noises due to the higher harmonic components of the operation clock CLK2 can be reduced according to the receiving frequency or the transmitting frequency, and degradation of the radio performance can be prevented by avoiding the disturbance over the receiving function and the transmitting function.

As described above, according to the communication device, the communication method, and the recording medium, the oscillation frequency of the clock is calculated by the operation frequency controlling means (operation frequency controlling step) such that the higher harmonics of the operation frequency of the clock can be positioned farthest from the receiving frequency or the transmitting frequency, and then the clock having the calculated operation frequency is generated by the clock generating means such as the PLL frequency synthesizer. Therefore, the oscillation frequency of the clock can be set easily at a high speed and with high precision such that the higher harmonic components of the clock which drives the processing means built in the communication device can be positioned farthest from the receiving frequency or the transmitting frequency. As a result, there can be provided the communication device, the communication method, and the recording medium which can reduce the noises due to the higher harmonic components of the operation clock, avoid the disturbance over the receiving function or the transmitting function of the communication device, and completely prevent deterioration of the radio performance.

In particular, since the clock generating means is constructed by the programmable PLL frequency synthesizer, the frequency variable range can be set wide and the frequency change can be made easy. Also, since the crystal oscillator is employed as the reference oscillator 101 to generate the reference signal (reference frequency), the operation frequency can be adjusted with extremely high precision.

Moreover, according to the present invention, the operation frequency of the clock is calculated previously relative to each receiving frequency or each transmitting frequency and then held in the storing means. Therefore, the oscillation frequency of the clock, which is able to reduce the noises due to the higher harmonic components and avoid the disturbance over the receiving function or the transmitting function, can be set easily at a higher speed and with high precision according to the receiving frequency or the transmitting frequency.

What is claimed is:

1. A communication device comprises:
    a clock generating means for generating a clock;
    a processing means which operates based on the clock; and
    a radio portion for processing a radio signal at a predetermined frequency;
    an operation frequency controlling means for calculating an operation frequency of the clock such that higher harmonics of the operation frequency of the clock is positioned farthest from the radio frequency, wherein the clock generating means generates the clock having the operation frequency calculated by the operation frequency controlling means.

2. A communication device as claimed in claim 1, wherein said radio portion is a receiver portion for receiving a signal transmitted from another communication device at a predetermined receiving frequency and demodulating it, and said operation frequency controlling means calculates an operation frequency of the clock such that higher harmonics of the operation frequency of the clock is positioned farthest from the receiving frequency.

3. A communication device as claimed in claim 1, wherein said radio portion is a transmitter portion for transmitting a transmit signal modulated at a predetermined transmitting frequency, and the operation frequency controlling means calculates an operation frequency of the clock such that higher harmonics of the operation frequency of the clock is positioned farthest from the transmitting frequency.

4. A communication device as claimed in claim 1, wherein said radio portion include a receiver portion for receiving a signal transmitted from another communication device at a predetermined receiving frequency and demodulating it, and a transmitter portion for transmitting a transmit signal modulated at a predetermined transmitting frequency, and said operation frequency controlling means calculates an operation frequency of the clock such that higher harmonics of the operation frequency of the clock can be positioned farthest from the receiving frequency or the transmitting frequency.

5. A communication device according to claim 1, wherein said clock generating means comprises a PLL frequency synthesizer which comprises a reference oscillator, a phase comparator, a low pass filter, a voltage controlled oscillator, and a variable frequency divider, and which varies the operation frequency of the clock by programmably changing a frequency dividing ratio of the variable frequency divider.

6. A communication device according to claim 1 further comprising: a storing means for holding calculation results of the operation frequency of the clock whose higher harmonics is positioned farthest from the radio frequency every radio frequency.

7. A communication method for a communication device including a clock generating means for generating a clock, a processing means which operates based on the clock, and a radio portion for processing a radio signal at a predetermined frequency, said communication method comprising:

an operation frequency controlling step of calculating an operation frequency of the clock such that higher harmonics of the operation frequency of the clock can be positioned farthest from the radio frequency, wherein the clock generating means generates the clock having the operation frequency calculated by the operation frequency controlling step.

8. A communication method as claimed in claim 7, wherein said radio portion is a receiver portion for receiving a signal transmitted from another communication device at a predetermined receiving frequency and demodulating it, and an operation frequency of the clock is calculated such that higher harmonics of the operation frequency of the clock can be positioned farthest from the receiving frequency.

9. A communication method as claimed in claim 7, wherein said radio portion is a transmitter portion for transmitting a transmit signal modulated at a predetermined transmitting frequency, and an operation frequency of the clock is calculated such that higher harmonics of the operation frequency of the clock is positioned farthest from the transmitting frequency.

10. A communication method as claimed in claim 7, wherein, said radio portion include a receiver portion for receiving a signal transmitted from another communication device at a predetermined receiving frequency and demodulating it, and a transmitter portion for transmitting a transmit signal modulated at a predetermined transmitting frequency, an operation frequency of the clock is calculated such that higher harmonics of the operation frequency of the clock is positioned farthest from the receiving frequency or the transmitting frequency.

11. A communication method according to claim 7, wherein said clock generating means includes a PLL frequency synthesizer which comprises a reference oscillator, a phase comparator, a low pass filter, a voltage controlled oscillator, and a variable frequency divider, and the operation frequency controlling step has a varying step of varying the operation frequency of the clock by setting a frequency dividing ratio into the variable frequency divider in accordance with a calculated operation frequency.

12. A communication method according to claim 7, further comprising:

a calculating step of calculating the operation frequency of the clock whose higher harmonics can be positioned farthest from the receiving frequency or the transmitting frequency every receiving frequency or every transmitting frequency; and a storing step of holding results calculated in the calculating step in a storing means.

13. A communication method according to claim 7, the operation frequency controlling step or the calculating step includes:

a first calculating step of calculating frequency difference between the higher harmonics, which can be positioned nearest to the receiving frequency or the transmitting frequency, out of the higher harmonics of the operation frequency of the clock and the receiving frequency or the transmitting frequency every operation frequency of the clock, which can be set in the clock generating means, and a second calculating step of identifying the higher harmonics, which has a maximum frequency difference out of frequency differences between higher harmonics which are calculated by the first calculating step and the receiving frequency or the transmitting frequency and then calculating the operation frequency of the clock corresponding to an identified higher harmonics.

14. A computer readable recording medium for recording, as a program, a communication method for a communication device including a clock generating means for generating a clock, a processing means which operates based on the clock, and a radio portion for processing a radio signal at a predetermined frequency, wherein said program causes a computer to carry out the communication method, wherein the communication method comprises:

an operation frequency controlling step of calculating an operation frequency of the clock such that higher harmonics of the operation frequency of the clock can be positioned farthest from the radio frequency;

wherein the clock generating means generates the clock having the operation frequency calculated by the operation frequency controlling step.

* * * * *